United States Patent
Hanglur Narasimha et al.

(10) Patent No.: US 11,888,310 B1
(45) Date of Patent: Jan. 30, 2024

(54) METHODS AND APPARATUS FOR PRECHARGE MONITORING OF HIGH VOLTAGE CIRCUITS

(71) Applicant: Motiv Power Systems, Inc., Foster City, CA (US)

(72) Inventors: Venkatesh Prasad Hanglur Narasimha, San Mateo, CA (US); James Michael Castelaz, Alameda, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 14 days.

(21) Appl. No.: 17/412,017

(22) Filed: Aug. 25, 2021

Related U.S. Application Data

(60) Provisional application No. 63/069,959, filed on Aug. 25, 2020.

(51) Int. Cl.
*H02H 9/00* (2006.01)
*H02H 9/04* (2006.01)

(52) U.S. Cl.
CPC ............ *H02H 9/001* (2013.01); *H02H 9/045* (2013.01)

(58) Field of Classification Search
CPC .............................. H02H 9/001; H02H 9/045
USPC .............................................................. 361/1
See application file for complete search history.

(56) References Cited

U.S. PATENT DOCUMENTS

| | | | | |
|---|---|---|---|---|
| 5,493,189 A | * | 2/1996 | Ling | H02P 6/14 |
| | | | | 318/400.27 |
| 5,619,127 A | * | 4/1997 | Warizaya | G05F 5/00 |
| | | | | 323/275 |

FOREIGN PATENT DOCUMENTS

| | | | | |
|---|---|---|---|---|
| CN | 205490125 U | * | 8/2016 | |
| JP | 08140260 A | * | 5/1996 | ............... G05F 5/00 |

OTHER PUBLICATIONS

Machine translation of Warisaya Japanese Patent Document JP H08-140260 A Nov. 10, 1994 (Year: 1994).*
Machine translation of Fu et al. Chinese Patent Document CN 205490125 U Dec. 31, 2015 (Year: 2015).*

* cited by examiner

*Primary Examiner* — Kevin J Comber
(74) *Attorney, Agent, or Firm* — Adibi IP Group, PC; Amir V. Adibi; Andrew C. Palmer

(57) ABSTRACT

Methods and apparatus to monitor the precharging of high voltage circuits are disclosed. In one embodiment, an apparatus includes a switch that selectively enables or disables precharge current to a high voltage circuit based on a switch control signal. The apparatus also includes a comparison circuit that compares a scaled version of a circuit voltage to a reference voltage to generate the switch control signal. In one embodiment, the switch control signal is generated to enable the precharge current when the scaled version of the circuit voltage is greater than the reference voltage.

23 Claims, 4 Drawing Sheets

PRECHARGE MONITORING CIRCUIT

PRECHARGE MONITORING CIRCUIT

PRECHARGE FAILURE

NO PRECHARGE FAILURE

PRECHARGE MONITORING CIRCUIT
(ANOTHER EMBODIMENT)

METHODS AND APPARATUS FOR PRECHARGE MONITORING OF HIGH VOLTAGE CIRCUITS

CROSS REFERENCE TO RELATED APPLICATIONS

This application claims the benefit under 35 U.S.C. § 119 from U.S. Provisional Patent Application No. 63/069,959, entitled "Methods And Apparatus For Precharge Monitoring Of High Voltage Circuits," filed on Aug. 25, 2020, the subject matter of which is expressly incorporated herein by reference.

TECHNICAL FIELD

The present invention relates generally to circuit precharging, and more specifically, to precharge monitoring of high voltage circuits.

BACKGROUND INFORMATION

Circuit precharging is used in high voltage circuits to reliably energize the circuit without damaging components. For example, the initial application of a high voltage to the circuit may result in large current spikes, due to a short circuit or capacitance for instance, and these spikes may damage components or even fuse the power switch contacts. Thus, a precharge circuit is used to slowly ramp up the supply voltage to the circuit.

Typically, precharge circuits are implemented using a positive temperature coefficient (PTC) thermistor, resistor or other device to limit current and dissipate power during precharge. Software may be used to compare a sensed voltage during precharge with an expected voltage at discrete time intervals.

SUMMARY

A precharge monitoring circuit is provided that monitors the precharging of a high voltage circuit and discontinues that precharging if the voltage of the high voltage circuit does not increase as rapidly as predicted by a model during precharge. The precharge monitoring circuit is activated to allow a precharge current to energize the circuit. A reference circuit generates a reference voltage curve having a predetermined time constant (e.g., R×C). During precharging, the reference voltage is compared to a scaled circuit voltage generated by the precharge current which is based on the voltage across the high voltage circuit. If the scaled circuit voltage is less than the reference voltage, a precharge switch is opened to discontinue precharging. Thus, the reference circuit voltage models the evolution of the scaled circuit voltage during precharge. If a large enough difference is detected between the reference circuit voltage and the scaled circuit voltage, then precharging is discontinued since it is likely that the high voltage circuit voltage did not evolve in accordance with the model during precharge. In the event that precharging has been discontinued, the precharge monitoring circuit may activate a fault signal to notify other controls that the precharge was not successful.

To ensure that the precharge monitoring circuit only discontinues precharge in the event of a precharge failure, the time constant of the reference circuit may be longer than the time constant of the high voltage circuit during precharge. In an alternative embodiment, the time constant of the reference circuit may be nearly the same as the time constant of the high voltage circuit during precharge and a positive offset voltage may be added to the scaled voltage of the high voltage circuit to provide some buffer from noise causing the precharge monitoring circuit to discontinue precharge. In another embodiment, the time constant of the reference circuit may be nearly the same as the time constant of the high voltage circuit during precharge and a negative offset voltage may be applied to the reference voltage to provide some buffer from noise causing the precharge monitoring circuit to discontinue precharge.

In one embodiment, an apparatus includes a switch that selectively enables or disables precharge current to a high voltage circuit based on a switch control signal. The apparatus also includes a comparison circuit that compares a scaled version of a circuit voltage to a reference voltage to generate the switch control signal. The switch control signal is generated to enable the precharge current when the scaled version of the circuit voltage is greater than the reference voltage.

In another embodiment, a method is provided for monitoring precharge of a high voltage circuit. The method comprises selectively enabling or disabling precharge current to the high voltage circuit based on a switch control signal. The method also comprises comparing a scaled version of a circuit voltage to a reference voltage to generate the switch control signal. The switch control signal is generated to enable the precharge current when the scaled version of the circuit voltage is greater than the reference voltage.

In another embodiment, an apparatus is provided for monitoring precharge of a high voltage circuit. The apparatus comprises a switch that controls precharging of a high voltage circuit. The apparatus also comprises means for enabling and disabling the switch by continually comparing a scaled version of a high voltage circuit voltage and a reference voltage. The switch control signal is generated to enable the precharge current when the scaled version of the circuit voltage is greater than the reference voltage.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
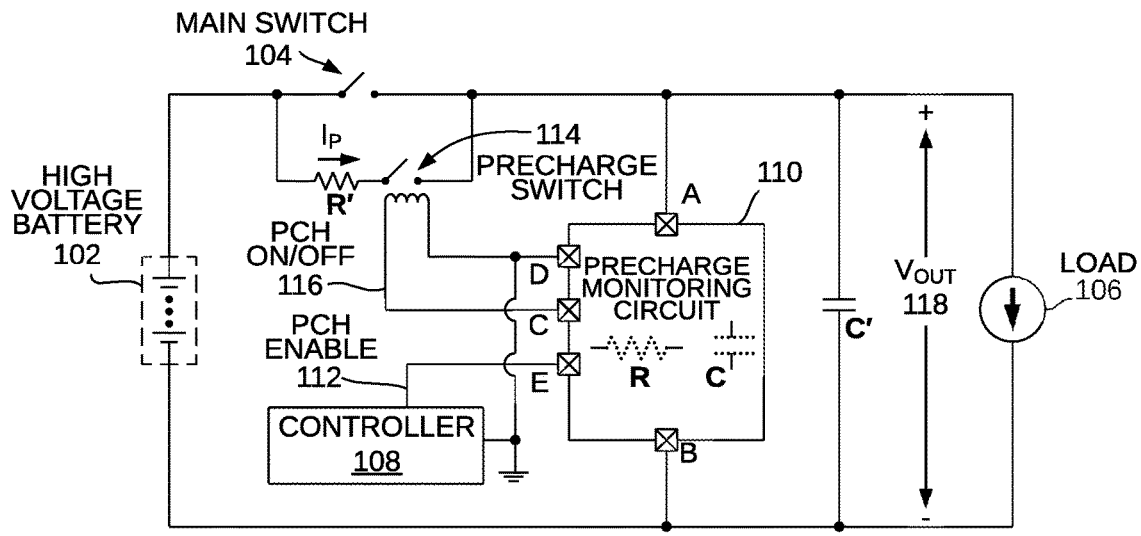
FIG. 1 is a diagram showing a precharge monitoring circuit for use with a battery operated device.

FIG. 1 is a diagram showing a precharge monitoring circuit 110 for use with a battery operated device. In this diagram, a battery 102 provides high voltage to a load 106 through a main switch 104. For example, the battery voltage may be 400 volts or greater. Connected across the main switch 104 is a precharge resistor R' in series with a precharge switch 114. The precharge resistor R' limits a precharge current (Ip) that flows to the load 106 when the switch 114 is closed. In an embodiment, the resistor R' has a resistance value of 200 ohms. In an embodiment, the precharge switch 114 is a solid state MOSFET device. C' is the capacitance across the load 106, which in one embodiment has a capacitance value of 6 millifarads (mf).

In an embodiment, a controller 108 initiates a precharging process before the main switch 104 is closed. The controller 108 outputs a precharge (PCH) enable signal 112 to enable the precharge process. The precharge enable signal 112 is input to the precharge monitoring circuit 110. The precharge monitoring circuit 110 outputs a PCH on/off signal 116 that closes the switch 114 and allows the precharging current Ip to flow to the load 106.

The precharge monitoring circuit 110 includes a reference resistor R and a reference capacitor C along with additional circuitry. In an embodiment, the precharge monitoring circuit 110 operates to allow precharging to occur as long as the load voltage increases over time at a rate which is characteristic of an R-C charging event. If this voltage does not evolve in accordance to the R-C charging, the precharge monitoring circuit turns off the PCH on/off signal 116, which opens the switch 114 to stop the precharging process. The precharge monitoring circuit may activate a fault indicator if it opens switch 114 before precharging is complete. A more detailed description of the implementation and operation of the precharge monitoring circuit 110 is provided below.

Figure 2:
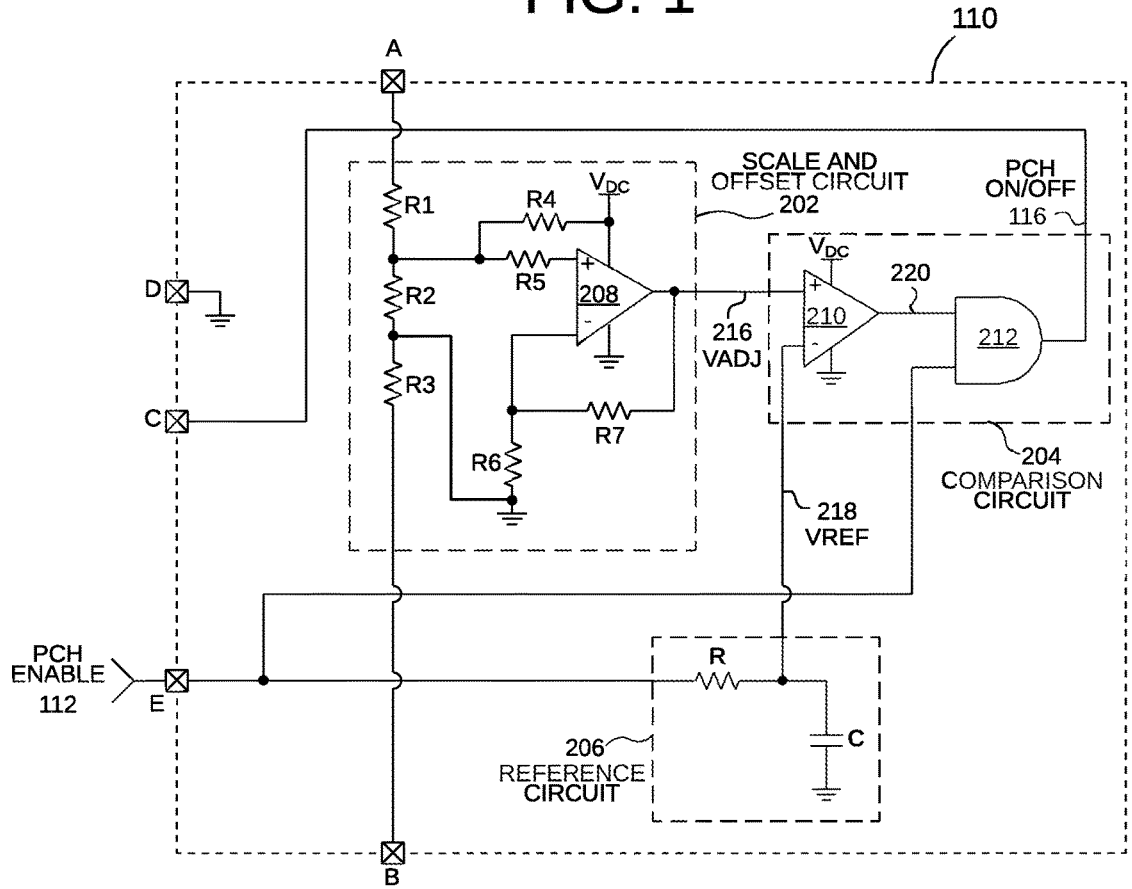
FIG. 2 is a diagram showing a detailed exemplary embodiment of a precharge monitoring circuit.

FIG. 2 is a diagram showing a detailed exemplary embodiment of the precharge monitoring circuit 110 shown in FIG. 1. In an embodiment, the precharge monitoring circuit 110 comprises a scale and offset circuit (SOC) 202, comparison circuit 204, and reference circuit 206.

The SOC 202 comprises an amplifier 208 and associated circuitry that adjusts an offset and scale of a voltage (Vout 118) across the load 106 that appears at terminal A relative to terminal B. The SOC 202 comprises resistors R1-R7, which are configured to tune the operation of the amplifier 208 to generate an adjusted voltage (VADJ) 216 referenced to ground which has a value equal to a scaled and offset value of Vout 118.

In an embodiment, Vout 118 is zero before precharging begins. The resistors R4, R5, and R6 set an offset voltage to the amplifier 208 based on the voltage (Vdc). The voltage Vdc is supplied from an external battery, or from the controller 108 or from a DC/DC step-down converter powered from the high voltage battery. This offset voltage appears at the amplifier output as the adjusted voltage (VADJ) 216 which has a small positive value when referenced to ground before precharging begins. In one embodiment, VADJ 216 may be 0.2 volts above ground before precharging begins.

The comparator circuit comprises a comparator 210 and a logic "AND" gate 212. The reference circuit 206 comprises the resistor R connected in series with the capacitor C. In an embodiment, the resistor R has a value of 200 kohms and the capacitor C has a value of 6 microfarads (uf). The controller 108 initially sets the PCH enable 112 to a logic low level (0), which sets the reference voltage (VREF) to zero volts. The comparator 210 receives the VADJ 216 and VREF 218 signals at its inputs and outputs a comparator voltage 220 at a high level (Vdc) since the offset voltage on the VADJ 216 is greater than zero on VREF 218. The AND gate 212 receives this high voltage level at an input terminal that is connected to the comparator 210. A second input terminal of the AND gate 212 is connected to receive the PCH enable signal 112.

When the controller 108 sets the PCH enable 112 to a high logic level, the AND gate 212 receives this high logic level and outputs the PCH on/off signal 116 at a high logic level since both inputs to the AND gate 212 are high. This closes the precharge switch 114 and enables the precharge current Ip to flow to the load 106. As the precharge current flows to the load 106, the voltage Vout 118 increases. At the same time, the high level on the PCH on/off signal 116 causes the voltage VREF 218 to increase with a time constant of (R×C).

As the voltage Vout 118 increases due to the flow of precharge current Ip, the resistor divider formed by R1, R2, and R3 scales the voltage Vout 118 and applies this scaled voltage referenced to ground to R5. This scaled voltage as well as the offset voltage appear at the output (VADJ 216) of the amplifier 208. The voltage at the output of the amplifier 208 increases with a time constant of (R'×C').

As the circuit precharges, the voltage Vout 118 across the load 106 increases. The voltage level of VADJ 216 increases and remains larger than the voltage level of VREF 218 since the time constant (R×C) is greater than or equal to the time constant (R'×C'). This keeps the output of the comparator 210 at a high level and maintains the PCH on/off signal 116 at the output of the AND gate 212 at a high level.

If there is an issue (such as a short circuit, a larger-than-expected load 106, or greater-than-expected system capacitance C') that causes the value of VADJ 216 to fall below the value of VREF 218 at a point in time during precharge, the comparator output 220 will go low and disable the AND gate 212. This will turn off the PCH on/off signal 116, which will turn off the precharge switch 114 and stop the flow of precharge current Ip to the load 106. Thus, the precharge monitoring circuit 110 monitors the flow of precharge current and allows the flow of precharge current to continue as long as the load voltage Vout 118 is greater than or equal to the reference voltage VREF 218 at all times during precharge.

Figure 3:
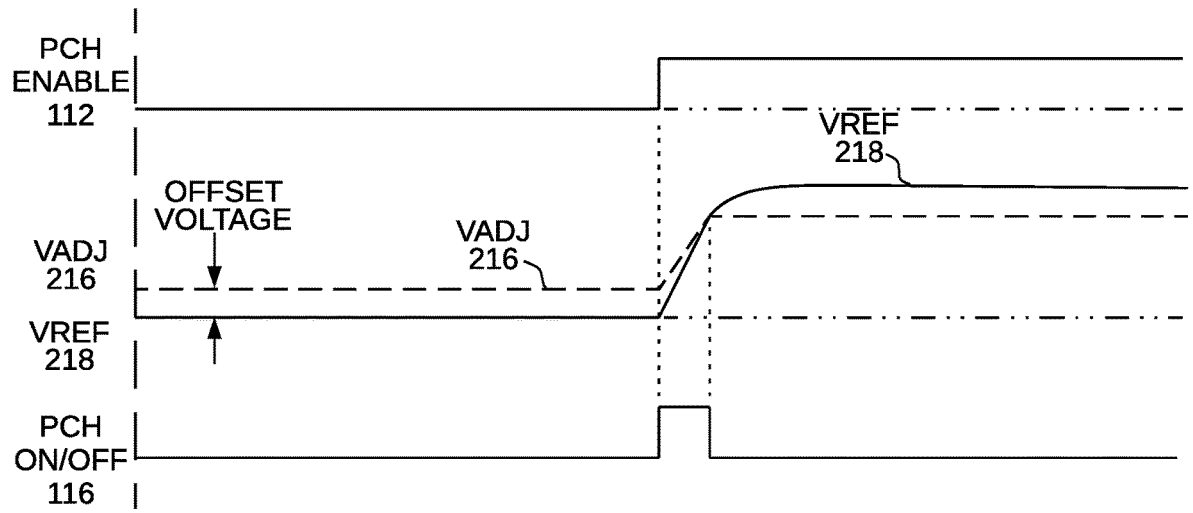
FIG. 3 is a diagram showing a plot of control signals of the precharge monitoring circuit.

FIG. 3 is a diagram showing a plot of control signals of the precharge monitoring circuit. As illustrated in FIG. 3, the PCH enable 112 is initially output at a low voltage level and VADJ 216 is set to have an offset voltage due to the resistors R4, R5, R6, and R7 connected to the amplifier 208. The controller 108 raises the PCH enable signal 112 to a high level, which results in the reference voltage 218 increasing in voltage with a time constant of (R×C). Initially the voltage on VADJ 216 is greater than the voltage on VREF 218 due to the offset voltage, which turns on the PCH on/off signal 116 to enable the precharge current Ip to flow to the load 106. However, in this case, the VADJ 216 voltage rises slower than the VREF 218 voltage, which quickly turns off the PCH on/off signal 116. The slower rise of VADJ 216 may be caused by the system capacitance C' being larger than expected, or by the load current being larger than expected. Thus, the precharging is cut short due to the load voltage Vout 118 increasing more slowly than the voltage of the reference circuit 206.

Figure 4:
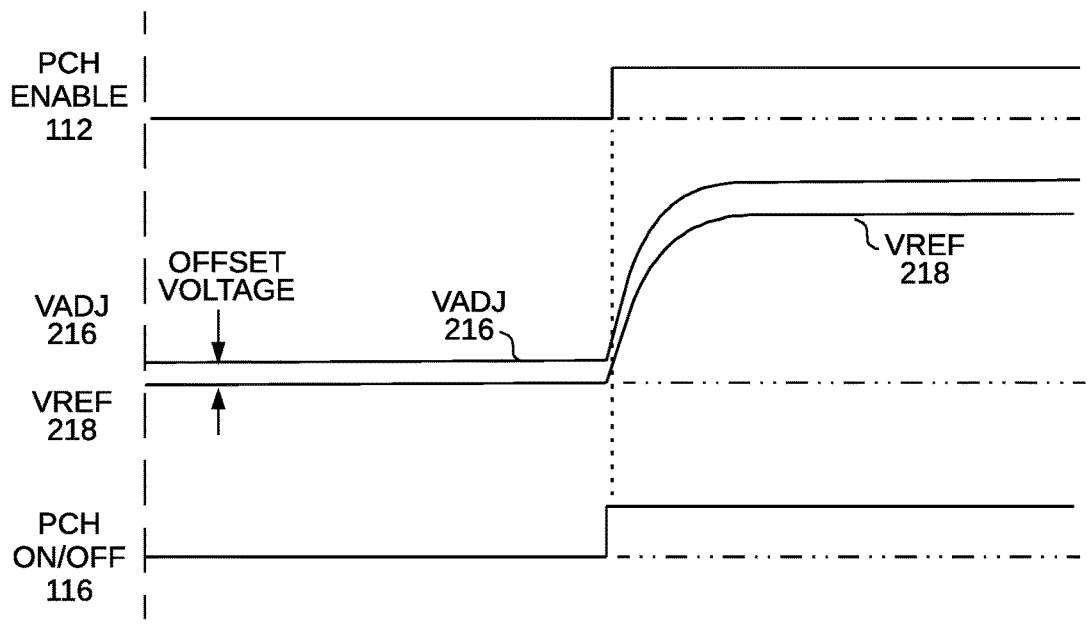
FIG. 4 is a diagram showing a plot of control signals of the precharge monitoring circuit.

FIG. 4 is a diagram showing a plot of control signals of the precharge monitoring circuit. As illustrated in FIG. 4, the PCH enable 112 is raised to a high level, which results in the reference voltage 218 increasing in voltage with a time constant of (R×C). Initially the adjusted voltage signal 216 is greater than the reference signal 218, which turns on the PCH command 116 to enable precharge current to the load 106. Since the output voltage Vout 118 increases with a time constant of R'×C' and thus the adjusted voltage 216 is always greater than the voltage of the reference circuit 206, VREF 218, precharging continues, as illustrated by the PCH on/off signal 116 maintaining the on state.

Figure 5:
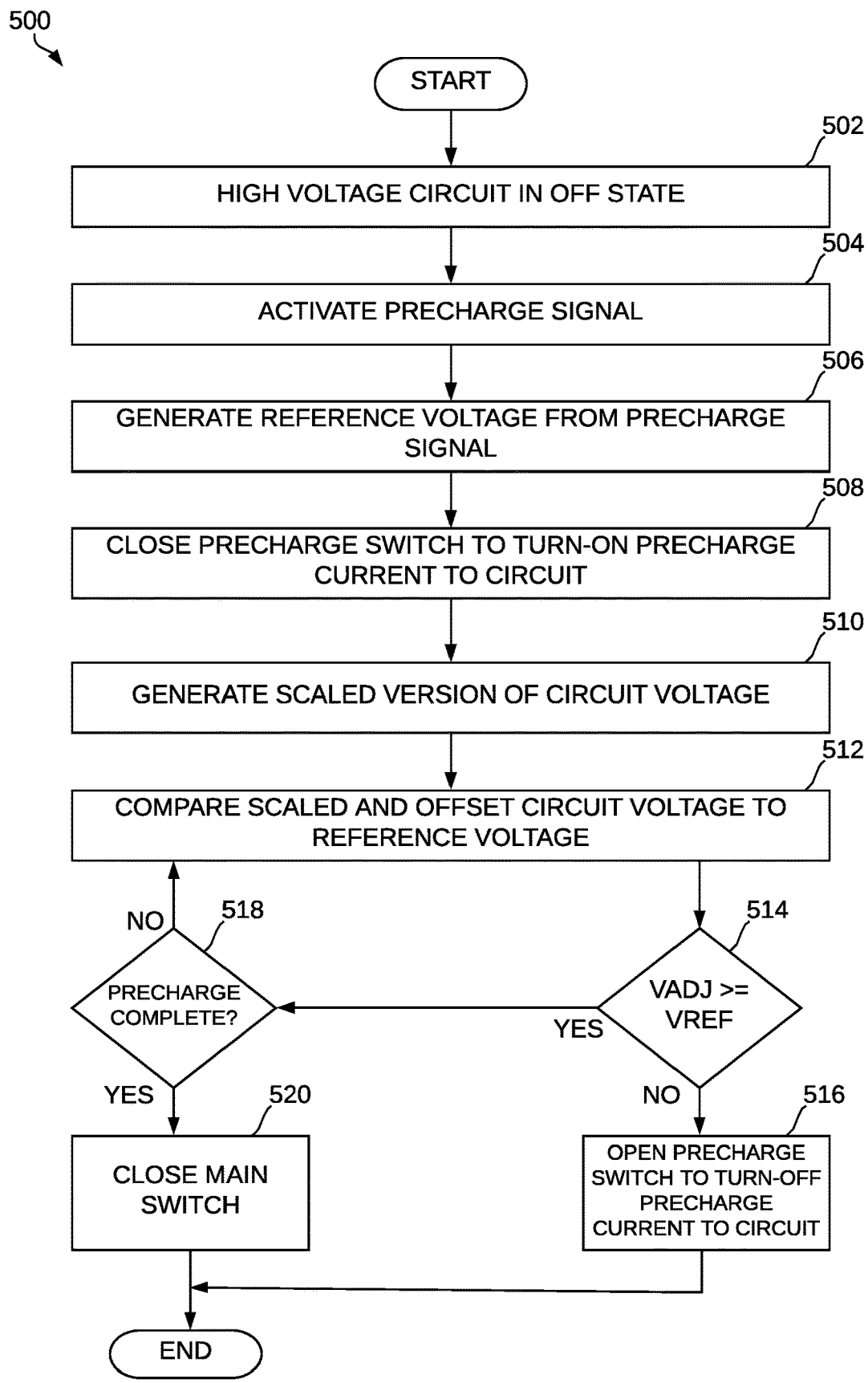
FIG. 5 is a diagram showing a method for performing precharge in a battery operated device.

FIG. 5 is a diagram showing a method 500 for performing precharge monitoring in a high voltage device. For example, the method 500 is suitable for use with precharge monitoring circuit 110 shown in FIG. 1.

At block 502, a high voltage circuit is in an off state. A DC voltage (Vdc) is activated to provide a DC offset voltage on the adjusted voltage 216.

At block 504, a precharge signal is activated. For example, the controller 108 activates the precharge enable signal 112.

At block 506, a reference voltage is generated from the precharge enable signal. For example, the reference circuit 206 generates the reference voltage 218 from the precharge enable signal 112.

At block 508, a precharge switch is closed to turn on a precharge current to the circuit. For example, the precharge switch 114 is closed by the PCH on/off signal 116 that is generated when the adjusted voltage 216 exceeds the reference voltage 218.

At block 510, a scaled and offset version of the circuit voltage is generated. For example, the voltage 118 is input to the scale and offset circuit 202. A scaled and offset version of this voltage is represented in the adjusted voltage 216.

At block 512, the adjusted voltage is compared to the reference voltage. For example, the adjusted voltage 216 is compared to the reference voltage 218 by the comparator 210 to generate the comparator voltage 220.

At block 514, a determination is made as to whether the adjusted voltage is greater than or equal to the reference voltage. If the adjusted voltage is greater than or equal to the reference voltage, the method proceeds to block 518. If the adjusted voltage is not greater than or equal to the reference voltage, the method proceeds to block 516.

At block 516, the precharge switch is opened to stop the precharge current from flowing into the circuit. For example, when the comparator voltage 220 falls below a logic high level, the AND gate 212 causes the PCH on/off signal 116 to go low, which opens the precharge switch 114.

At block 518, a determination is made as to whether the precharge operation is complete. If the precharge operation is not complete, the method proceeds to block 512. If the precharge operation is complete, the method proceeds to block 520.

At block 520, the main power switch is closed since the precharge operation has completed. For example, the main switch 104 is closed to connect the high voltage battery 102 to the circuit 110. The precharge switch 114 is opened thereby disabling the precharge current Ip.

Thus, the method 500 operates to monitor precharging of a high voltage battery operated circuit. It should be noted that the operations described are exemplary and not limiting of the embodiments. Also, the operations described may be re-arranged, modified, deleted, added to, or otherwise changed within the scope of the embodiments.

Figure 6:
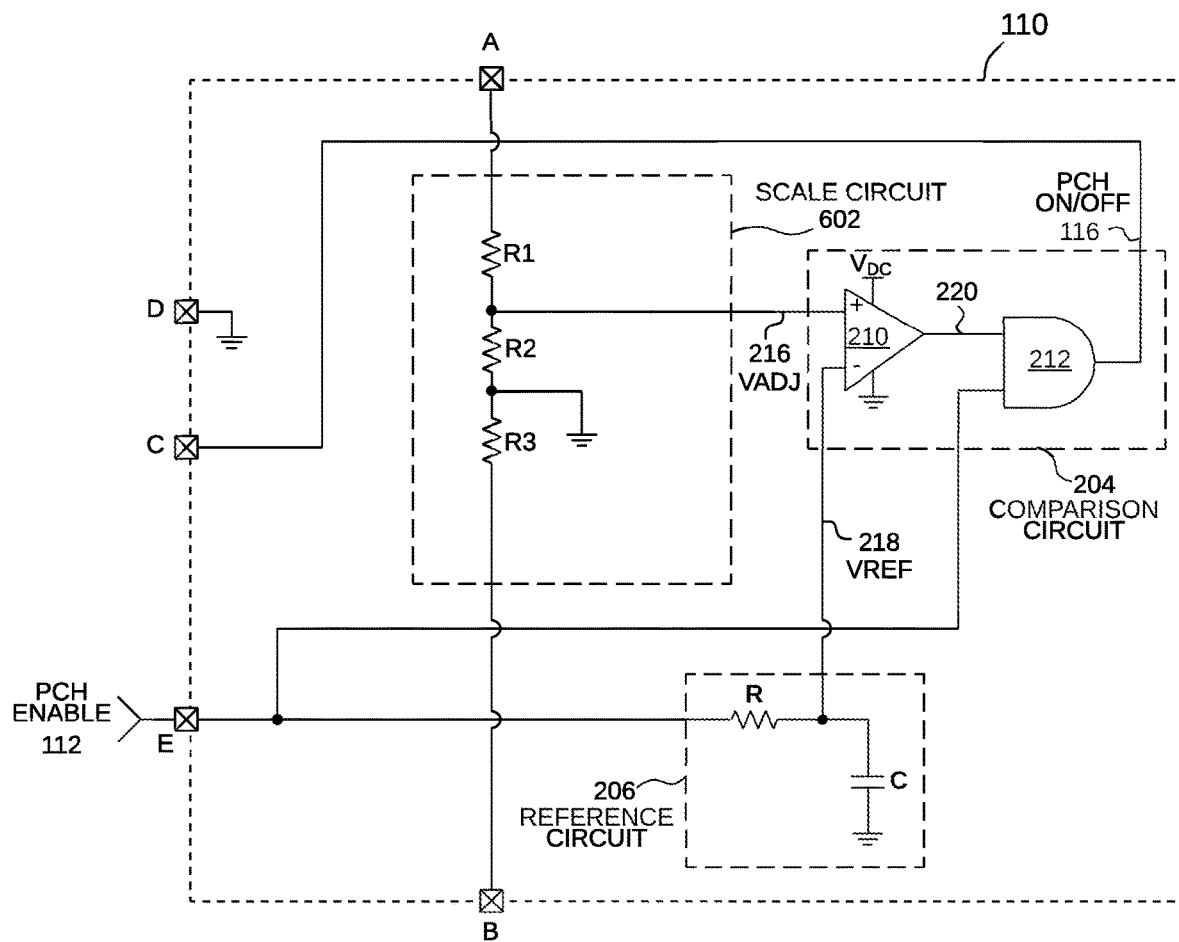
FIG. 6 is a diagram showing an alternative detailed embodiment of a precharge monitoring circuit.

FIG. 6 is a diagram showing an alternative detailed embodiment of the precharge monitoring circuit 110 shown in FIG. 1. In the embodiment shown in FIG. 6, the scale and offset circuit 202 is replaced with the scale circuit 602. The scale circuit 602 scales the voltage Vout to form VADJ 216 and inputs this scaled voltage directly to the comparator 210. Without the offset, the adjusted voltage VADJ 216 and the reference voltage VREF 218 start at the same voltage level. Thus, to begin and continue precharging, the rate of increase of the voltage VADJ 216 must be greater than the rate of increase of VREF 218 to have the comparator output 220 remain at a high level to enable the AND gate 212 to generate the PCH on/off signal 116.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus comprising:
   a precharge switch that selectively enables or disables precharge current from a Direct Current (DC) source to a capacitor;
   a comparison circuit that generates a switch control signal to continuously control the precharge switch, wherein the switch control signal is generated based on a comparison between a scaled version of a circuit voltage and a reference voltage; and
   a reference circuit that receives a precharge command signal and generates the reference voltage, wherein the precharge switch changes state in response to the precharge command signal changing state.

2. The apparatus of claim 1, further comprising:
   a resistor connected in series with the precharge switch, wherein both the resistor and the precharge switch are connected between a high voltage supply and the capacitor, and wherein the high voltage supply outputs a voltage of at least 400 volts.

3. The apparatus of claim 2, wherein the resistor is configured to generate a selected amount of current as the precharge current.

4. The apparatus of claim 1, wherein the precharge command signal is a PCH ENABLE precharge command signal.

5. The apparatus of claim 4, wherein the reference circuit comprises an RC circuit that receives the PCH ENABLE precharge command signal and generates the reference voltage.

6. The apparatus of claim 4, further comprising:
   a controller that generates the PCH ENABLE precharge command signal.

7. The apparatus of claim 1, wherein the comparison circuit generates the switch control signal to control the precharge switch to enable the precharge current to the capacitor it when the scaled version of the circuit voltage is greater than the reference voltage.

8. The apparatus of claim 7, wherein the comparison circuit comprises:
   a comparator that receives the reference voltage at a negative input terminal and receives the scaled version of the circuit voltage at a positive input terminal and generates a comparison voltage at an output terminal; and
   a logic AND gate that receives the comparison voltage and a precharge command signal and generates the switch control signal.

9. The apparatus of claim 1, further comprising:
   a voltage generator that receives and scales the circuit voltage to generate the scaled version of the circuit voltage.

10. The apparatus of claim 9, wherein the voltage generator comprises:
a resistor network that forms a voltage divider that receives the circuit voltage and generates the scaled version of the circuit voltage which shares a voltage reference point with the reference voltage.

11. The apparatus of claim 9, wherein the voltage generator comprises:
a resistor network that forms a voltage divider that receives the circuit voltage and generates a divided voltage which shares a voltage reference point with the reference voltage; and
an amplifier that receives the divided voltage and adjusts for scale and offset to generate the scaled version of the circuit voltage.

12. The apparatus of claim 1, further comprising:
a main switch coupled between the DC source and the capacitor, wherein the main switch is controllable independently from the precharge switch.

13. A method comprising:
selectively enabling or disabling precharge current from a Direct Current (DC) source to a capacitor based on a switch control signal; and
comparing a scaled version of a circuit voltage to a reference voltage to generate the switch control signal, wherein the comparing is performed non-discretely during precharge, wherein the reference voltage is generated from a precharge command signal, and wherein the switch control signal changes state in response to the precharge command signal changing state.

14. The method of claim 13, further comprising:
generating a selected amount of current for use as the precharge current.

15. The method of claim 13, wherein the the reference voltage is generated using an RC circuit that receives the precharge command signal.

16. The method of claim 12, further comprising:
generating the precharge command signal using a controller.

17. The method of claim 12, further comprising
receiving and scaling the circuit voltage to generate the scaled version of the circuit voltage.

18. The method of claim 12, wherein the operation of comparing comprises:
dividing the circuit voltage to generate a divided voltage; and
referencing the divided voltage to a voltage reference point to generate the scaled version of the circuit voltage, wherein the reference voltage is also referenced to the voltage reference point.

19. The method of claim 12, wherein the operation of comparing comprises:
comparing the reference voltage to the scaled version of the circuit voltage to generate a comparison voltage; and
performing a logic AND function with the comparison voltage and the precharge command signal to generate the switch control signal.

20. The method of claim 13, wherein the switch control signal controls a precharge switch, wherein a main switch is coupled between the DC source and the capacitor, and wherein the main switch is controllable independently from the precharge switch.

21. An apparatus comprising:
a switch that controls precharge current from a Direct Current (DC) source to a capacitor; and
means for enabling and disabling the switch by continually comparing a scaled circuit voltage and a reference voltage wherein the reference voltage is generated from a precharge command signal, and wherein the switch changes state in response to the precharge command signal changing state.

22. The apparatus of claim 21, wherein the means is a precharge monitoring circuit.

23. The apparatus of claim 21, wherein a main switch is coupled between the DC source and the capacitor, and wherein the main switch is controllable independently from the switch that controls precharge current.

* * * * *